Figure 1:
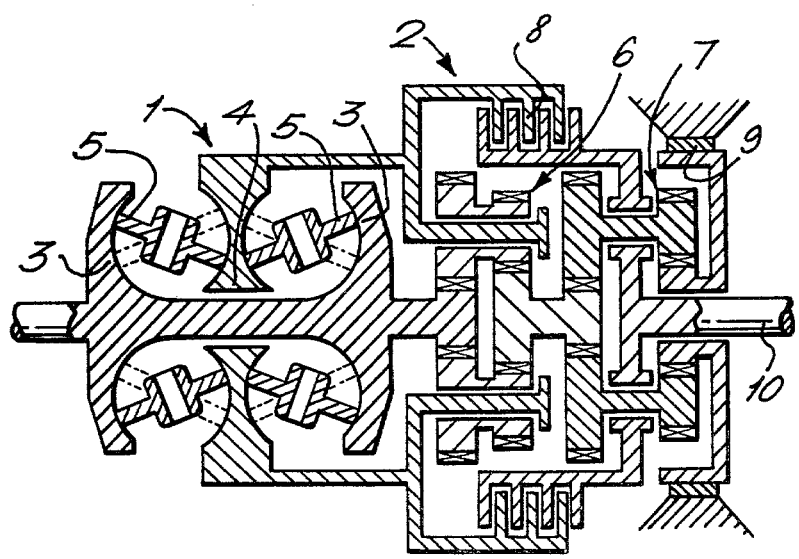

United States Patent [19]

Poole et al.

[11] 4,355,547

[45] Oct. 26, 1982

[54] CONTINUOUSLY VARIABLE RATIO TRANSMISSION

[75] Inventors: Joseph J. Poole, Coventry; Victor E. Strange, Solihull, both of England

[73] Assignee: BL Cars Limited, London, England

[21] Appl. No.: 43,614

[22] Filed: May 30, 1979

[51] Int. Cl.³ .................... F16H 15/08; F16H 13/00; F16H 3/74

[52] U.S. Cl. ........................ 74/690; 74/200; 74/208; 74/752 A; 74/752 C; 74/867

[58] Field of Search ............ 74/196, 198, 199, 200, 74/206, 208, 690, 691, 752 A, 752 C, 752 D, 867, 868, 869, 865, DIG. 1; 137/885, 869, 870, 606; 192/4 A

[56] References Cited

U.S. PATENT DOCUMENTS

| | | | |
|---|---|---|---|
| 3,058,374 | 10/1962 | Miller | 74/DIG. 1 |
| 3,295,387 | 1/1967 | Leonard et al. | 74/DIG. 1 |
| 3,306,119 | 2/1967 | De Brie Perry et al. | 74/200 |
| 3,334,530 | 8/1967 | Lamburn et al. | 74/DIG. 1 |
| 3,336,815 | 8/1967 | Leonard | 74/DIG. 1 |
| 3,406,597 | 10/1968 | De Brie Perry et al. | 74/865 |
| 3,448,640 | 6/1969 | Nelson | 74/752 A X |
| 3,454,031 | 7/1969 | Kaptur | 137/869 X |
| 3,543,610 | 12/1970 | Kogaki | 74/DIG. 1 |
| 3,545,302 | 12/1970 | Schofield | 74/865 X |
| 3,548,682 | 12/1970 | Schofield et al. | 74/865 X |
| 3,574,289 | 4/1971 | Scheiter et al. | 74/867 X |
| 3,684,065 | 8/1972 | Scheiter | 74/691 X |
| 3,705,642 | 12/1972 | Thompson | 192/4 A |
| 3,715,017 | 2/1973 | Jenney | 192/4 A |
| 3,826,147 | 7/1974 | Sharpe et al. | 74/200 |
| 3,828,618 | 8/1974 | Sharpe et al. | 74/200 |
| 3,886,819 | 6/1975 | Lentz | 74/868 |
| 3,894,560 | 7/1975 | Baugh | 137/606 |
| 4,111,074 | 9/1978 | Northup | 74/867 |
| 4,159,653 | 7/1979 | Koivunen | 74/200 |
| 4,252,033 | 2/1981 | Triffitt | 74/199 X |

FOREIGN PATENT DOCUMENTS

| | | |
|---|---|---|
| 1425820 | 8/1970 | Fed. Rep. of Germany . |
| 1280987 | 7/1972 | United Kingdom . |
| 1392440 | 4/1975 | United Kingdom . |
| 1392450 | 4/1975 | United Kingdom . |
| 1392707 | 4/1975 | United Kingdom . |

Primary Examiner—Leslie Braun
Attorney, Agent, or Firm—Brisebois & Kruger

[57] ABSTRACT

A continuously variable ratio transmission of the rolling friction type has a hydraulic control circuit including an end loading device for the transmission located upstream of a double sided piston used to balance roller reaction torque, and a valve for controlling the force exerted by the double sided piston. The valve has two outlets each feeding one side of the piston and communicating with the transmission's sump by way of a device for equalizing the flow rates from the two outlets to the sump. A feedback arrangement provides that the force exerted on the spool of the control valve is always proportional to the force exerted by the piston. The piston travel is limited by hydraulic end stops, upstream of which is provided a pressure relief valve to eliminate damaging transient overloads being exerted by the end loading device. The circuit also includes a facility whereby normal electrical/electronic control of the control valve can be overridden in an emergency.

17 Claims, 2 Drawing Figures

CONTINUOUSLY VARIABLE RATIO TRANSMISSION

This invention relates to continuously variable ratio transmissions and more particularly to control systems for transmissions of the "rolling friction" type wherein rotatable elements engage one another in a rolling relationship capable of variation to vary the ratio between an input member and an output member of the transmission.

In an example of such a transmission tiltable rollers provide a driving connection between facing surfaces of an input disc and an output disc mounted for rotation about a common main axis. In their equilibrium positions, the roller axes intersect the main rolling axis of the discs; to change the transmission ratio the roller axes are discplaced out of their equilibrium positions causing the rollers to steer to a different tilt angle and hence a different ratio. When the desired ratio is thus obtained, the rollers are returned to their equilibrium condition. Each of the rollers exhibits a driving torque reaction and the roller steering means, which may be hydraulic or mechanical, must balance the total roller torque reaction. The transmission ratio is then changed under steady load conditions by varying the balancing force to above or below that needed to match roller torque reaction. This can be achieved by employing a hydraulic control circuit having, for example, a double sided piston or an interconnected pair of pistons. Force on, say, the double sided piston is then determined by the pressure difference between the fluid on its two sides, and thus the transmission ratio can be controlled by varying the value of this pressure difference.

According to one aspect of the present invention there is provided a continuously variable ratio transmission of the rolling friction type, having a hydraulic control circuit comprising a source of pressurized fluid, and valve means for controlling fluid flow to a pair of outlets each connected to a sink by way of a respective flow restriction means, characterized in that the difference in pressure in said outlets intermediate said valve means and said flow restriction means is used to balance roller torque reaction and said pressure difference is proportional to the actuating force on said valve means at least under steady state conditions.

Preferably the flow restriction means comprise means for ensuring equal flow rates through each of said restrictions to said sink. Thus the means may, for example, have variable flow cross sectional area orifices in order to vary their flow resistance to control the flow rate of fluid. Such an arrangement enables the pressure difference in the outlets to be proportional to the actuating force at all times, even when additional fluid flow is generated in the outlets by movement of the piston resulting from movement of the rollers in response to changed transmission speeds.

Preferably means are provided to ensure that pressure immediately downstream of said flow restriction means is kept at or above a datum pressure, whereby hydraulic fluid is maintained in each of said outlets irrespective of whether they are in communication with said source by way of said valve means.

Moreover it is preferred to include flow control means for ensuring that the flow rate of fluid passing through said valve remains substantially constant. This feature will be particularly beneficial when said source comprises a pump driven directly by an engine so that excessive flow rates and consequential pumping losses will be avoided as engine speed increases.

Pressurized fluid from said source may be used to provide the end load on the rolling components of the transmission. This method of providing end load has the advantage that the relationship between end load and torque transmitted through the rolling components, as reflected by the roller torque reaction, can be determined over the range of steady state operating conditions. Difficulties occur however when the rollers are forced under transient conditions to the extreme ends of their operating range, since if mechanical end stops are used to limit roller tilt angle the hydraulic roller control force would be supplemented by an indeterminate load on the mechanical end stops. This results in a mismatch between the roller control force and the loading on the rolling components, and can lead to slippage and possibly damage of the rolling surfaces.

To overcome these difficulties the use of hydraulic end stops has been proposed, whereby movement of the rollers to their extreme tilt angle causes the flow of fluid from source to sink to be severely curtailed downstream of some hydraulic means for balancing the roller reaction torque thus causing pressure in the circuit to rise to provide an adequate balancing force to maintain wholly hydraulic control. The high pressure is of course also transmitted to the end loading device so that the predetermined relationship between roller reaction torque and end loading is maintained.

Viewed from a second aspect the invention provides a continuously variable ratio transmission of the rolling friction type, having a hydraulic control circuit comprising a source of pressurized fluid, end loading means for the rolling components, and hydraulic end stop means located downstream of said end loading means, characterized by means for attenuating peak pressures in the fluid upstream of said hydraulic end stop means.

Although such attenuation means can result in a mismatch between end load and roller reaction torque and is thus apparently counter productive, the applicants have discovered that it is preferable to risk such mismatch if extreme end loadings on the rolling components such as during transient conditions can be avoided by reducing peak fluid pressures.

The attenuation means can be constituted by an arrangement such as a known shock alleviator, but could alternatively be a simple pressure relief valve for example.

Viewed from a third aspect the invention provides a continuously variable ratio transmission of the rolling friction type, having a hydraulic control circuit including a source of pressurized fluid, electrically operated valve means controlling fluid flow to means for balancing roller torque reaction, and having emergency override means comprising means for disabling the electrical operation of said valve means and means for effecting operation of the valve means by fluid pressure from said source.

Such an arrangement enables the transmission to continue to transmit torque should the electronic unit controlling operation of the valve means malfunction. If the transmission is coupled to an epicyclic gearset to provide a plurality of operating regimes, means will be included to override the electrical actuation of valves controlling the transmission brake or clutch as appropriate to retain drive in low regime.

Figure 2:
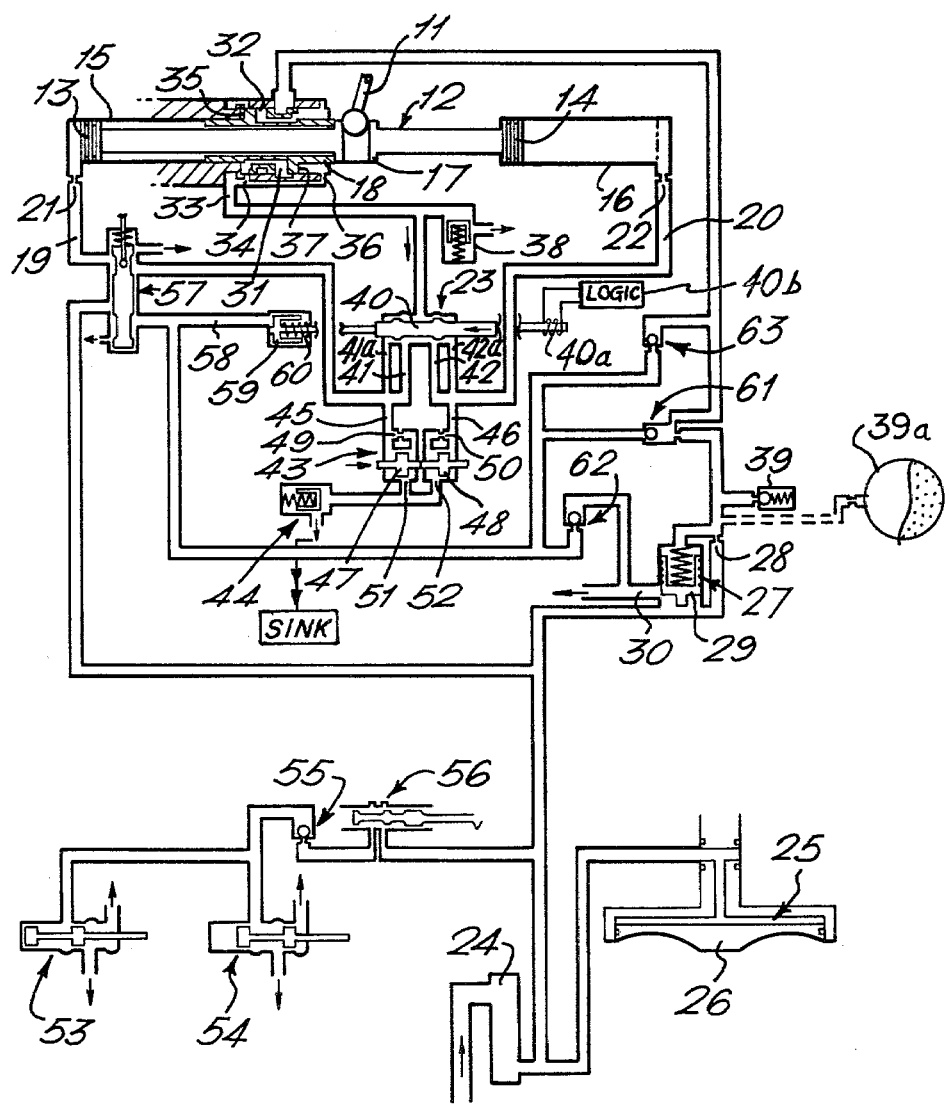

An embodiment of the invention will now be described by way of example and with reference to the accompanying drawings in which:

FIG. 1 is a schematic view of a continuously variable ratio transmission of the rolling friction type connected to an epicyclic gearset; and FIG. 2 is a hydraulic control circuit for the transmission of FIG. 1.

FIG. 1 shows a variable ratio transmission 1 of the rolling friction type connected to a compound epicyclic gear set 2. Transmission 1 comprises a pair of input discs 3. Rotation of the discs 3 is communicated to an output disc 4 by rollers 5 which are tiltable inter alia to the positions shown in phantom. Output from the variable-ratio transmission is passed to a first epicyclic gearset 6 and thence through a second gearset 7. The carriers of gearsets 6 and 7 can be locked together by a clutch 8 whilst a brake 9 provides further control over operation of the gearset 2. Output from the transmission is by way of a shaft 10 connected to the carrier of gearset 7.

In FIG. 2, a lever 11 is connected to a mechanical linkage (not shown) for controlling roller tilt angle. Roller torque reaction is transmitted through the linkage to lever 11, and can act in either direction dependent upon the torque flow direction through the transmission.

Means are provided for exerting a force on lever 11 thereby to balance and determine roller reaction torque. A double acting piston 12 has end portions 13 and 14 which slide in cylinders 15 and 16 respectively and has a central portion 17 which receives the end of lever 11 and carries a sliding sleeve 18. Cylinders 15 and 16 are fed with pressurized fluid by passages 19 and 20 which have respective constrictions 21 and 22 which act as dampers on piston motion and prevent hunting under steady load conditions. The pressure difference across the piston is controlled by a valve means 23.

A positive fixed displacement pump 24 supplies pressurized oil to the circuit, and is driven directly by the engine of a vehicle in which the transmission is mounted. The output of the pump is used to provide end loading on the rolling components by way of a piston cylinder unit shown schematically at 25, the piston 26 being part of one of the end discs 3 engaged by the peripheries of the rollers (FIG. 1). Downstream of the end loading device 25 the pumped flow passes through flow control means 27 which ensures that the flow rate through the valve means 23 remains substantially constant, although the pump output may be varying by up to eight times this flow rate due to variations in engine speed. Flow control means 27 operate by passing flow to the valve means 23 through a constricted orifice 28; the pressure drop across the orifice, which is proportional to the flow rate, creates a pressure difference across a sprung piston 29 to bring the flow upstream into communication with a conduit 30 which supplies oil to a lubrication system for the transmission. This partially vents the pump output, and the spring rate acting on piston 29 is such that a sufficient amount of the pump output can be diverted into conduit 30 to ensure that the flow rate through constricted orifice 28 can be maintained within the required limits.

Under normal circumstances all the flow passing through orifice 28 will then proceed to the sleeve 18 where it enters an annular passage communicating with passage 31, as shown, or with passage 32 when the sleeve is at the other end of its travel. Either passage 31 or passage 32 is normally in communication with passage 33 leading to valve means 23. As the sleeve is displaced by movement of lever 11 to its extreme left hand (as viewed) position however, corresponding to an extreme tilt angle of the rollers, passage 31 communicates with passage 33 only by way of the now constricted orifice 34 as shown. This effectively produces a blockage in the oil flow and causes a build up of pressure upstream of the orifice 34. The increased fluid pressure then acts on shoulder 35 of the sleeve to force it to the right (as viewed), thereby preserving an opening at 34 and moreover providing a hydraulically determined force limiting lever movement and hence roller tilt angle, balancing roller reaction torque. When the lever and rollers are at the other end of their travel, communication between passages 32 and 33 will be restricted at orifice 36 to provide the required limiting force by way of pressure build up on shoulder 37. The arrangement thus provides hydraulic end stops for the roller tilt angle control, and hence the relationship between roller reaction torque and end loading by way of piston cylinder unit 25 is predetermined for the vast majority of operating circumstances, and damage through roller slippage effectively obviated.

Excessive circuit pressure is guarded against by a high pressure blow-off valve 38 which communicates with a fluid sink comprising the oil sump which is at a base pressure. Because the blow-off valve 38 is located downstream of the hydraulic end stop arrangement, it cannot act to relieve pressure upstream of orifices 34 or 36 if, for example, lever movement causes these orifices to be completely closed such as in the event of there being shock loadings on the transmission. This is considered desirable in as much as it means that the valve 38 cannot reduce the force produced by the hydraulic end stops by reducing the maximum pressure available for acting on shoulder 35 or 37; if it were otherwise the lever force might overcome the hydraulic end stops and be restrained by the mechanical stops, resulting in a roller torque which is higher than ideal for the end loading available from unit 25. Roller slippage could result, with possible damage to the rolling surfaces. Such has been the extent of thinking hitherto.

The provision only of such a high pressure blow-off valve as 38 has, however, a disadvantage. The applicants have discovered that under certain conditions pressure upstream of the hydraulic end stops can rise to such an extent as to damage the rolling components by the application of excessive end load. Accordingly means are provided for attenuating peak pressures in the circuit upstream of the end stops, comprising an ultra-high pressure blow-off or pressure relief valve 39 to the sump. When valve 39 opens, some of the pressure rise that would otherwise occur is attenuated so that the force exerted by the hydraulic end stops may not match the force required to balance the lever 11. In this case the force on the lever will be due to the hydraulic end stops and also to the mechanical end stops so that a mismatch between end load and lever force occurs and roller slippage may result.

The pressure rating of the valve is such however, that only those peak pressures likely to cause damage to the rolling components by way of excessive end loadings are attenuated; below these pressures the no-slip conditions are retained. It will be appreciated that at the peak pressures referred to, which will be essentially of a transient nature, the risks of damage caused by slippage are of less significance than damage such as a cracking disc, which can result from excessive end loading. Instead of an ultra-high pressure blow-off valve other means, such as a gas-filled shock alleviator 39a, could of course be used.

Valve means 23 includes a spool 40 normally activated by an electro-magnetic device 40a, which is controlled by an electronic logic circuit 40b. The valve has a pair of outlets 41 and 42 which are connected to passages 19 and 20 respectively. A pair of passages 41a, 42a feed fluid pressure in the respective outlets back to the valve means so that a force is exerted on the spool 40 proportional to the pressure difference in the outlets. This is balanced by the actuating force on the spool, and this arrangement will, on its own provide that at least under steady state conditions the pressure difference across the piston, and hence the lever force, is proportional to the actuating force on the valve spool. This is in turn proportional to the voltage across the electro-magnetic means.

Flow from the outlets 41 and 42 then passes to the sump by way of flow equalization means 43 and means for ensuring that pressure in each outlet always exceeds a datum level, comprising a very low pressure valve 44. Valve 44 ensures that at no time will fluid drain out of either of passages 19 or 20 if for example they become isolated from the pump by valve means 23, since otherwise there could be a delay in subsequent control functions if the passage and cylinder 15 or 16 had to be re-filled with fluid.

Flow equalization means 43 ensures that the flows through each of the passages 45 and 46 are equal; this ensures that the actuating force on spool 40 is always proportional to the pressure difference in the outlets 41 and 42, even when the piston moves. The flow equalization means operates by subjecting each of interconnected pistons 47 and 48 to the pressure difference across a respective flow restricting orifice 49 and 50. The pressure difference in each case will be proportional to the flow rate through the orifice, and the flow rates are adjusted by movement of the pistons to vary the flow cross sectional areas of orifices 51 and 52. The interconnected pistons thus move until they are in equilibrium which is to say the flow rates through orifices 49 and 50 are equalized.

Solenoid controlled valves 53 and 54 control hydraulic actuation of the brake 9 and clutch 8 respectively and are connected to the pump output by way of a non-return valve 55. Valve 55 ensures that operating pressure is maintained in the valves at all times, including occasions when pump output drops, by storing up peak pump pressures. Slippage of the clutch and brake are thereby avoided. A control valve 56 connected to a manual selector lever (not shown) such as that used in conventional automatic gearboxes, isolates the clutch and brake when the lever is in the "Park" and "Neutral" positions.

The remaining facility of the circuit is an emergency override or "get you home" arrangement. This will be used for example in the event of a malfunction in the electronic logic circuit. Operation of a control on the vehicle's dashboard will serve firstly to disable the electrical operation of the various valves in the hydraulic circuit whilst energizing the solenoid controlling the brake to actuate that component, and secondly to operate a valve 57 in the hydraulic circuit. Operation of valve 57 connects the passage 19 to the sump and supplies fluid at pump pressure to passage 58. This causes valve spool 40 to be thrust to the right as viewed, by piston 59 against the action of spring 60, which directs the majority of the oil flow into outlet 42 and via orifices 50 and 52 and datum, valve 44 to the sump. Orifices 50 and 52 being effectively fixed generate a pump output pressure proportional to pump speed on the right hand side of piston 12. In addition, fluid under pressure is fed via non-return valve 63 to the valve means 23, thus by-passing the flow control means 27 which is isolated from the valve means 23 by valve 61. Flow of fluid for lubrication purposes is provided via a non-return valve 62.

In operation this override facility causes an actuating force to be exerted on piston 12 in proportion to engine speed which in turn causes the force on the lever 11 and hence transmission torques to be proportional to engine speed. The proportionality depends on the sizes of orifices 50 and 52 which are sized to give reasonable driving torques without excessive engine speeds. The transmission will remain in low regime since the brake is always actuated while the clutch is not, and thus the speed of the vehicle will be limited. The facility will however enable the driver to proceed to a garage or service area in the event of electrical malfunction.

What is claimed is:

1. A continuously variable ratio transmission of the rolling friction type including a plurality of tiltable rollers and a hydraulic circuit for controlling the tilt angle of said rollers, said control circuit comprising:
    a source of pressurized fluid;
    a valve means;
    a sink for said fluid;
    a pair of outlets from said valve means for conveying fluid to said sink;
    a flow restriction means for restricting fluid flow from each of said outlets to said sink; and
    means operative in response to pressure difference in the fluid in said outlets for providing a force to balance roller torque reaction;
    said valve means being arranged to have an actuating force which is proportional to said pressure difference, at least under steady state conditions.

2. A transmission as claimed in claim 1, wherein said flow restriction means include means for ensuring equal flow rates through each of said restrictions to said sink.

3. A transmission as claimed in claim 2, wherein said means for ensuring equal flow rates includes an orifice of variable flow cross-sectional area.

4. A transmission as claimed in claim 1, including means for ensuring that pressure immediately downstream of said flow restriction means is kept at or above a datum pressure.

5. A transmission as claimed in claim 1, including flow control means for ensuring that the flow rate of fluid passing through said valve means remains substantially constant.

6. A transmission as claimed in claim 5, wherein said source comprises a pump driven at a speed proportional to the input speed of the transmission.

7. A transmission as claimed in claim 1, including an electro-magnetic means and an electronic logic circuit controlling said electro-magnetic means, for controlling said valve means.

8. A continuously variable ratio transmission of the rolling friction type having a plurality of tiltable rollers and a hydraulic circuit for controlling the tilt angle of said rollers, said control circuit comprising:
    a source of pressurized fluid;
    means operable by fluid pressure for providing a force to balance roller torque reaction;

hydraulic end stop means associated with said roller torque reaction balancing means, whereby to limit the tilt angle of said rollers;

end loading means located upstream of said end stop means for providing a reaction force between the rolling components; and means for attenuating peak pressures in the fluid upstream of said end stop means.

9. A transmission as claimed in claim 8, wherein said attenuating means comprises a pressure relief valve.

10. A transmission as claimed in claim 8, wherein said attenuating means comprises a shock alleviator.

11. A transmission as claimed in claim 10, wherein said shock alleviator includes a reservoir of compressible fluid.

12. A transmission as claimed in claim 8, including means for maintaining fluid in said circuit downstream of said end stop means at or above a datum pressure.

13. A continuously variable ratio transmission of the rolling friction type, having a plurality of tiltable rollers and a hydraulic control circuit including:

a source of pressurized fluid;

means operable by fluid pressure for producing a force to balance roller torque reaction;

valve means for controlling fluid flow to said roller torque reaction balancing means; and emergency override means for overriding electrical control of said valve means and for effecting operation of said valve means by fluid pressure from said source.

14. A transmission as claimed in claim 13, further comprising an epi-cyclic gearset coupled to the rolling components in such manner as to permit selective operation in any one of a plurality of regimes, wherein said override means operate to override the regime selection controls to retain the transmission in a predetermined regime.

15. A transmission as claimed in claim 13, wherein said override means actuates said valve means by a resiliently biased piston-cylinder unit in communication with said source.

16. A transmission as claimed in claim 13, wherein said roller torque reaction balancing means include a double-sided piston, and wherein said override means operate to connect one side of said piston to base pressure.

17. A continuously variable ratio transmission as claimed in claim 13, or 15, wherein said override means apply to said valve means a biasing force variable proportionally with the input speed of the transmission.

* * * * *